April 15, 1969

K. SILVON 3,438,286

FILE GUIDE FOR A CHAIN SAW

Filed Nov. 18, 1966

KAY SILVON
INVENTOR

BY
BUCKHORN, BLORE, KLARQUIST & SPARKMAN
ATTORNEYS

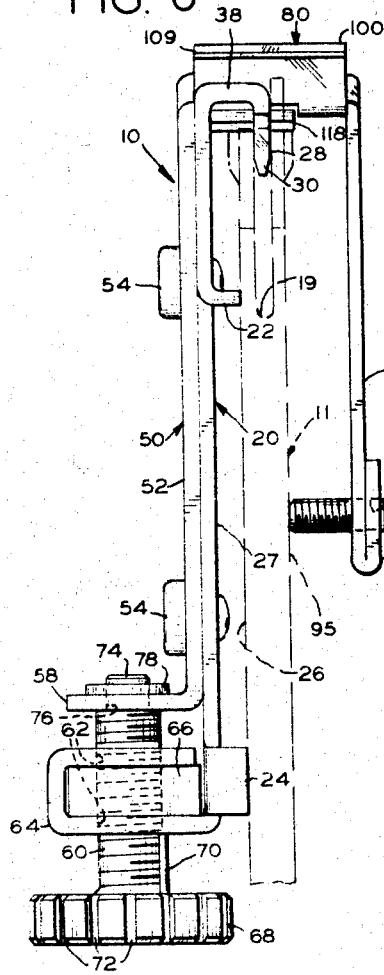
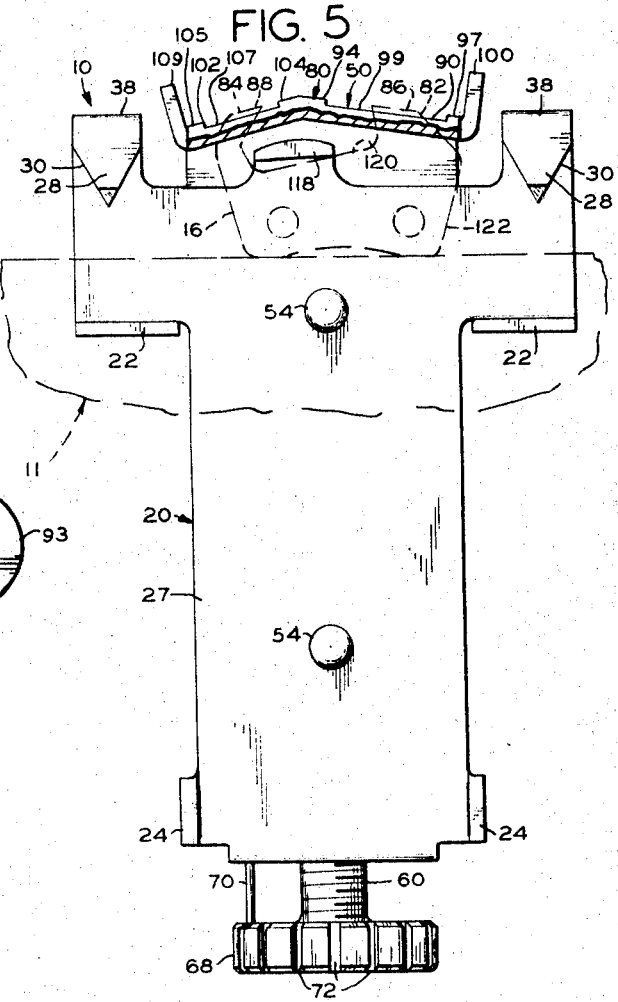
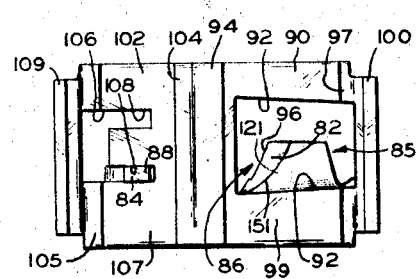

KAY SILVON
*INVENTOR*

BY
*BUCKHORN, BLORE, KLARQUIST & SPARKMAN*
ATTORNEYS

United States Patent Office 3,438,286
Patented Apr. 15, 1969

3,438,286
FILE GUIDE FOR A CHAIN SAW
Kay Silvon, Portland, Oreg., assignor to Omark Industries, Inc., Portland, Oreg., a corporation of Oregon
Filed Nov. 18, 1966, Ser. No. 595,488
Int. Cl. B23d 63/08; G01b 5/20
U.S. Cl. 76—36                    16 Claims This invention relates to a file guide for a chain saw, and more particularly to a file guide for manual filing of the top of a cutter and the top of a depth gauge of a cutter link of a saw chain while the saw chain is mounted on a chain saw guide bar.

In sharpening the tops of saw chains while mounted on chain saws, sharpening elements have been mounted on the saws near the sprockets or near the noses of the saw bars and are operable by being pressed against the tops of the cutters and depth gauges of the saw chains to sharpen the cutters and grind down the depth gauges, as illustrated by the operation of the saw chain sharpener disclosed and claimed in Carlton Patent 3,040,602. It is often desirable to use top sharpening saw chains on chain saws not equipped with top sharpening devices. It would be desirable to have a small, compact, top sharpening filing guide adapted to guide a file and which can be manually held on a saw chain on a chain saw for precisely top sharpening the saw chain and then removed from the saw chain after the latter has been sharpened.

An object of the invention is to provide a file guide for a chain saw.

Another object of the invention is to provide a file guide for manual filing of the top of a cutter and the top of a depth gauge of a cutter link of a saw chain while the saw chain is mounted on a chain saw.

A further object of the invention is to provide a file guide which can be carried in the pocket of a user until needed, then placed on a saw chain on a chain saw, serve to guide a file to precisely file cutters and depth gauges of the saw chain and then be removed completely from the chain saw guide bar and replaced in the pocket.

Another object of the invention is to provide a file guide adapted to rest on a saw chain, make the saw chain tight, guide a file to file down a top of a cutter of the saw chain to a predetermined height and with a predetermined top clearance, and guide the file to reduce a depth gauge height to provide a predetermined difference in height between the cutter and the depth gauge.

Yet another object of the invention is to provide a file guide which can be placed manually on and held manually in a position engaging the side of a saw bar with a file guiding portion which engages only edge portions of a file, overhangs a saw chain and has openings through which extend projecting elements to be filed of the saw chain.

The invention provides a file guide for a chain saw in which a file guiding portion permits a cutter and a depth gauge to extend therethrough for filing them, and a mounting portion adjustably carrying the file guiding portion engages the saw chain and locates the file guiding portion precisely relative to a cutter and a depth gauge of a cutter link. In a file guide forming a specific embodiment of the invention, a mounting frame having a plurality of projections adapted to engage the side of a saw bar is held manually in a position in which the projections engage the side of the saw bar and a pair of spaced hooks of the frame extend over side links of the chain and engage center drive links of the chain to tension the portion of the chain between the two center drive links. An angular guide plate having file clearance recesses, an opening for a cutter and a slot for a depth gauge of a cutter link positioned between the above two center drive links is carried adjustably by the frame. The guide plate has a first top surface adjacent the top of the cutter to guide a file and regulate the depth and angle to which the top of the cutter is filed away. The guide plate also has a second top surface adjacent the depth gauge to guide the file and regulate the depth and angle to which the depth gauge may be filed. The opening in the guide plate is large enough to receive the cutters of both right and left hand cutter links and the guide plate also has a second slot for receiving a depth gauge of opposite handling from the depth gauge received by the first-mentioned slot. The slots preferably are just slightly larger than the thicknesses of the depth gauges so as to support the cutter links against lateral movement when the links are filed.

A complete understanding of the invention may be obtained from the following detailed description of a file guide forming a specific embodiment thereof, when read in conjunction with the appended drawings, in which:

FIG. 5 is an enlarged, side elevation view of the file guide of FIG. 1;

FIG. 6 is an enlarged vertical sectional view taken substantially along line 6—6 of FIG. 2;

FIG. 7 is an enlarged, fragmentary view of the file guide and a cutter tooth;

Figure 1:
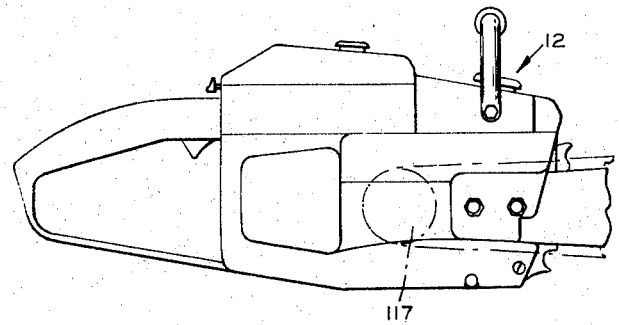
FIG. 1 is a side elevation view of a chain saw and a file guide forming one embodiment of the invention.
Figure 2:
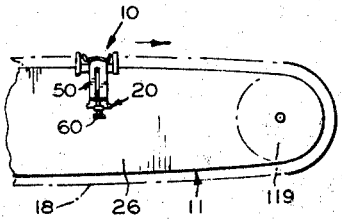
FIG. 2 is an enlarged, fragmentary side elevation view of the chain saw and file guide of FIG. 1.
Figure 4:
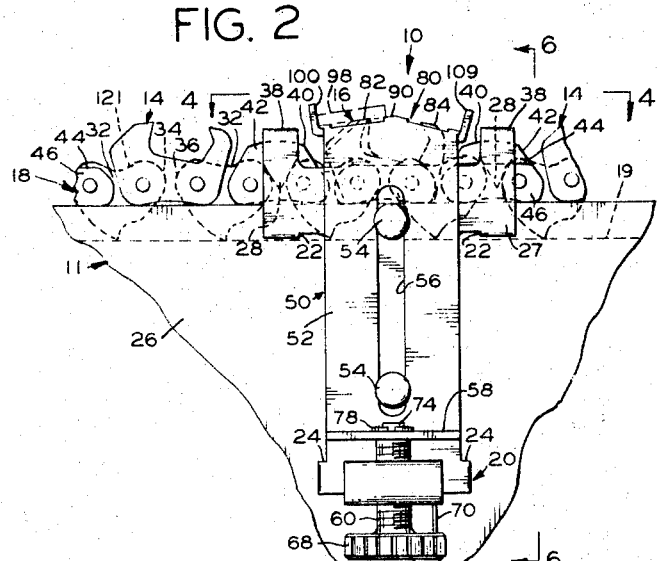
FIG. 4 is a top plan view taken substantially alone line 4—4 of FIG. 2.

Referring now in detail to the drawings, there is shown in FIG. 1 a file guide 10 forming a specific embodiment of the invention adapted to be held manually on a saw bar 11 of a chain saw 12 for regulating the filing of allochiral cutter links 14 and 16 (FIGS. 2, 4 and 5) of a saw chain 18 traveling along a groove 19 of the saw bar. The file guide includes a frame plate 20 having spacer tabs 22 and 24 adapted to engage a side face 26 of the saw bar 11 and position a body 27 of the frame plate parallel to the saw bar. The frame plate also has hook-shaped locators 28 extending over the saw chain and having tapered camming portions 30 extending down between center drive links 32 and engaging and fitting between corner portions of pairs of rounded end portions 34 and 36 of pairs of the center drive links at opposite ends of the one of the cutter links 14 and 16 to be sharpened. The camming portions 30, if necessary, stretch out the portion of the saw chain therebetween to remove all slack therefrom and precisely locates the frame plate longitudinally of the cutter link between the camming portions. This also precisely locates the frame plate relative to the cutter link between the camming portions along a line transverse to the saw chain and parallel to the plane of the saw bar. The camming portions 30 are sufficiently long that overhanging, offsetting portions 38 of the hook-shaped locators 28 completely clear outer edges 40 of any adjacent guard links 42 of the saw chain, and, of course, clear outer edges 44 of any adjacent tie link 46 of the saw chain. The camming portions lie in a plane parallel to the body portion of the frame plate and having the centerline of the saw bar therein. That is, the camming portions are centered between the sides of the groove 19 in the saw bar. The thickness of the camming portions is slightly less than that of the drive links and decreases at the very end portions of the tips of the camming portions so that the camming portions freely enter between the links 42 and 46. However, the camming portions fit closely between the links 42 and 46 to substantially eliminate lateral movement of the saw chain relative to the frame plate.

Figure 3:
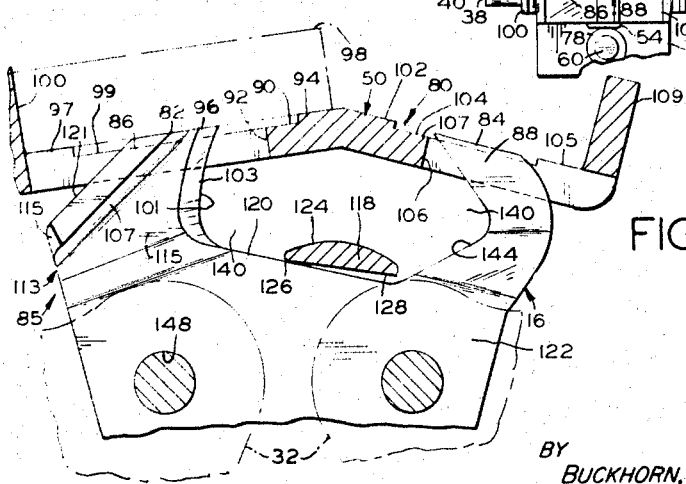
FIG. 3 is an enlarged, fragmentary side elevation view of a portion of the file guide of FIG. 1 in operative position on a cutter tooth.

A file guiding plate 50 (FIGS. 2, 3 and 6) of the general shape of an inverted U preferably is of hardened steel or chrome plated steel. The plate 50 has a first plate portion 52 retained slidably on the frame plate 20 by headed pins 54 carried rigidly on the frame plate and spaced along the centerline of the body 27 and projecting through a slot 56 extending longitudinally of the body portion 52. A transverse flange 58 forms a handle and a stop, the flange initially being manually pressed downwardly and secured to an adjustment screw 60 and engaging a shoulder portion of the adjustment screw, which is carried by the frame plate. Pressing the plate 50 downwardly seats the frame plate on the saw chain and saw bar. The user then need not hold the file guide and can use both hands to file the cutter tooth and depth gauge. The screw 60 is threaded through tapped bores 62 in a looped portion 64 of the frame plate which retains a plastic lock nut 66 therein. A notched head 68 of the screw is held against accidental rotation by a spring detenting wire 70 carried by the frame plate. The head 68 and wire 70 form a click stop or detent, notches 72 of the head being equally spaced around the periphery of the head, so that an audible indication of each increment of a few thousandths of an inch of adjustment of the screw is given. A reduced end portion 74 of the screw extends rotatably through a bore 76 in the flange 58 and a retaining clip 78 is secured to the end portion 74.

At the upper end of the file guiding plate 50 (FIGS. 3 and 5), there is provided a transversely extending angular member 80 serving as a combined filing guide and gauge to regulate precisely the extents to which tips or surfaces 82 and 84 of a top plate 86 and a depth gauge 88 of a cutter tooth 85 of each of the cutter links 14 and 16 are filed down. The member 80 is supported by the plate portion 52 and a second plate portion 87, which is opposite to the plate portion 52. The plate portion 87 has a folded back lower end portion 89 provided with a tapped bore 91 through which a set screw 93 is screwed and lightly touches face 95 of the saw bar to steady the plate 50 relative to the saw bar.

Figure 9:
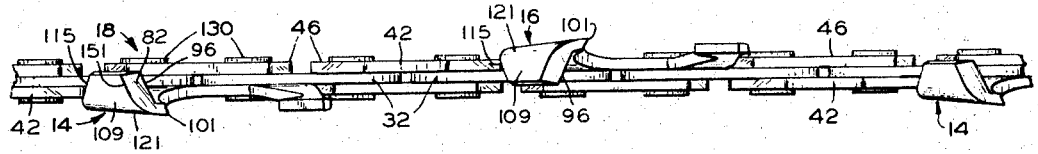
FIG. 9 is an enlarged top plan view of the saw chain of FIG. 8.
Figure 10:
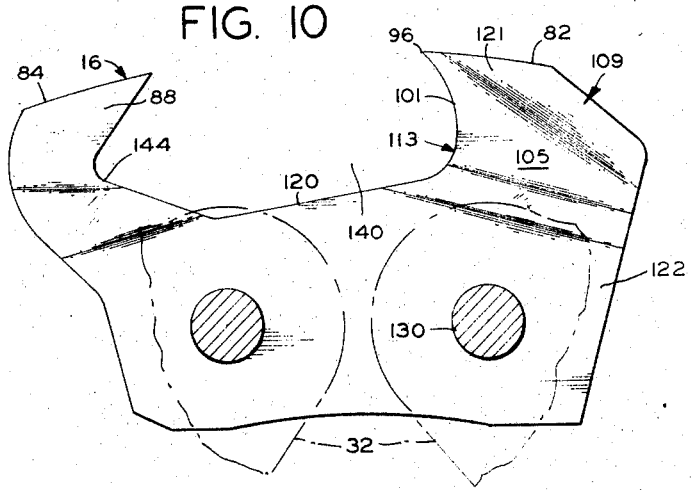
FIG. 10 is an enlarged side elevational view of a cutter link of the saw chain of FIG. 8.
Figure 11:
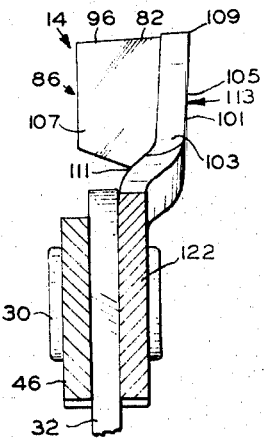
FIG. 11 is an enlarged vertical sectional view taken along line 11—11 of FIG. 8.

The member 80 includes a recessed guide portion 90 having a hole 92 of a width and length sufficient to permit the top plates 86 of both of the allochiral cutter links 14 and 16 to extend therethrough to expose the tip 82 thereof above raised lands 94 and 97 of the guide portion 90 for filing the tip 82 down to an extent in which the tip 82 lies in the plane of the lands 94 and 97 to sharpen a top cutting edge 96 of the top plate 86, which cuts the bottom portion of the kerf, locate the cutting edge 96 at a predetermined height above the pitch line of the saw chain, and provide a predetermined top clearance slope on the tip 82. Each cutter tooth 85 also includes a side cutting or slitting edge 101 (FIG. 9) defined by forward edge portion 103 and side face 105 of a side plate 113. The top cutting edge 96 is defined by the top surface 82 and a bottom surface 107 (FIG. 3) of the top plate. The cutter tooth 85 preferably is of steel and is surface hardened, as, for example, by chrome plating only on the bottom surface 107, rounded transition portion 109 and side faces 105 and 115 of the side plate. That is, by providing a plating of chromium only on these surfaces, the cutting edges 96 and 101 are tough, have longevity and are easily filed to sharpen them. It is especially important that upper, rear surfaces 109 of the top plate 86 be substantially free of chrome so that the top surfaces 82 can be filed easily and without quick destruction of the file portion employed to sharpen the top plates. The slitting edges 101 are best sharpened by a cylindrical file moved across the edge portion 103 in a direction proceeding from the face 115 toward the face 105 of the side plate. It is desirable that the upper portion of side plate 113 project forwardly of the adjacent portion of the top plate 86 so that the edge portion 103 can be filed without engagement of the file with the portion of the cutting edge 96 formed by the top plate thereby avoiding damage to the cutting edge 96. This shape causes the cutting edge to be stepped or jogged and, due to the slope of the surface 82, causes the portion of the cutting edge 96 on the side plate 105 to be higher than the portion of cutting edge 96 formed on the top plate 86. This gives an easily effected, narrow slitting path or dado effect by the side plate and the raking action of the portion of the edge 96 formed by the top plate is also facilitated.

Figure 8:
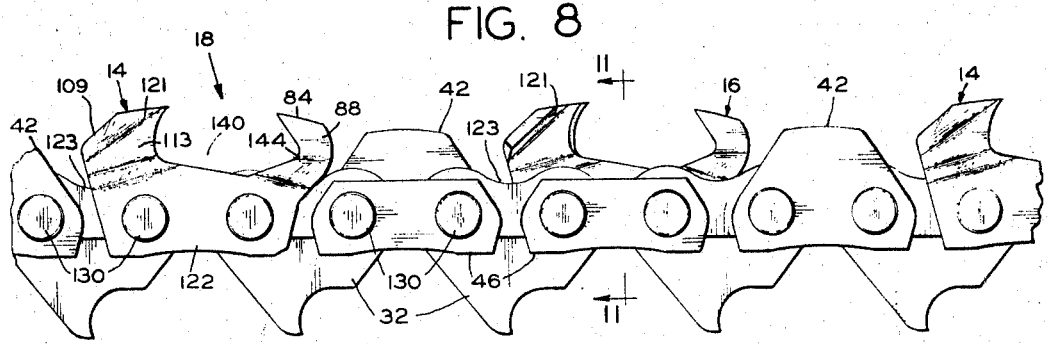
FIG. 8 is an enlarged side elevation view of a sequence of a saw chain sharpened by the file guide of FIG. 1.

To prevent damage to the saw chain from bumping of the cutter teeth 85 with the drive links 32, as the chain folds somewhat in coming off of a drive sprocket 117 (FIG. 1) and a nose roller 119 of the chain saw, rear or trailing edge 115 (FIG. 8) of the top late 86 is sloped forwardly from the side plate 113 and the top edges of the drive links 32 are contoured or provided with notches 121. This provides clearance preventing such bumping while permitting a long, bent junction or transistion portion 121 to provide strength to the cutter tooth.

The lands 94 and 97 lie in the same plane and act as a guide surface for a flat side of a file 98, particularly during the final filing strokes in bringing the tip 82 into the plane of the lands 94 and 97, the file being moved manually transversely of the saw bar. A tab or ear 100 extending transversely of the face 94 forms a side edge guide for the file to limit lateral movement of the file and keep the file over the tip 82. The lands 94 and 97 have a wide recess 99 therebetween and are so spaced that only edge portions of the file engage the hard surface, and the central portion of the file, which is the actual filing portion thereof which is used during filing, is not dulled during filing since it does not engage the hard surface of the member 80.

The member 80 also includes a guide portion 102 inclined oppositely to and at a steeper angle than that of the cutter guide portion 90 and forming an angle with the cutter guide portion 90. Lands 104 and 105 of the guide portion 102 and lying in the same plane form the file guiding and limiting or gauging surface for filing the tip 84 of the depth gauge 88 to the height desired relative to the height of the cutting edge 96 of the top plate 86 when filed to the face 94. This provides the desired height differential between the outermost end of the tip 84 and the cutting edge 96. The upper faces of the lands 104 and 105 preferably are hard, filing resistant surfaces, which engage only the edge portions of the file, a clearance recess 107 being positioned between the lands 104 and 105. The depth gauge guide portion 102 has clearance opening 106 (FIGS. 3 and 4) including two parallel guide slots 108, which closely and slidably receive the depth gauges 88 of the allochiral cutter links 14 and 16, one slot 108 being for the depth gauges of the right hand cutter links and the other slot 108 being for the depth gauges of the left hand cutter links. The slots 108 provide clearance for the depth gauges to project therethrough and hold the depth gauges against lateral movement thereby holding each cutter link filed against lateral movement with the file as the file is moved across either the depth gauge or the top plate of the cutter link being filed. The member 80 also has a tab or ear 109 which acts as a guide for the side edge of the file 98 while the tip 84 of the depth gauge is being filed.

The frame plate 20 (FIGS. 2, 5 and 6) has at its upper end a transverse hold-down flange 118 for engaging a predetermined point of a sloping edge 120 of a body 122 of each cutter link 14 or 16 to precisely locate the angular member 80 outwardly relative to the cutter link. The flange 118 holds the cutter link down against the upper edge of the saw bar 11. The flange 118 also prevents movement of the cutter link outwardly away from the saw bar during filing. The locators 28 locate the flange 118 precisely longitudinally of the cutter link 14 or 16 to be filed, and the flange 118 precisely locates the outward position of the file guide relative to the cutter link to be filed. The locators 28 are so shaped that, when the saw chain is new and unworn, the locators fully seat between the driving links and take all slack out of the portion of the saw chain therebetween just as the flange 118 firmly engages the cutter link to be filed. When the chain has been used extensively and has some play at the rivets, the locators do not quite fully tension the portion of the chain therebetween but omit doing so only to a negligible extent and still precisely locate the cutter link longitudinally relative to the flange 118, which firmly engages the cutter link to precisely control the height of the member 80 relative to the cutter link.

The flange 118 (FIG. 3) has an angular upper surface 124 substantially parallel to the angular member 80 to provide clearance for the angular member 80 when the member 80 is adjusted to its lowermost position. A corner 126 of the flange 118 is the portion which engages the edge 120 and does the gauging of the depth of filing. The corner 126 is the only portion of the flange 118 which engages the edge 120, a corner 128 of the flange 118 being raised sufficiently to clear the adjacent drive link 32.

As described above, the saw chain 18 comprises the cutter links 14 and 16 (FIGS. 8 and 9), the center drive links 32, the guard links 42 and the tie links 46, the several links being connected by rivets 130. In order to provide maximum chip clearance, minimum weight of the chain and maximum strength of the cutter links, a very deep gullet 140 is formed by the forward edge 103 of the cutter tooth, the edge 120 and rear edge 144 of the depth gauge 88. The edge 120 slopes forwardly and inwardly so that the gullet is deep, particularly at its forward end while the distance from a rear rivet hole 148 to the edge 120, the area of greatest load during use of the saw chain, is maintained long to make the cutter links strong.

To provide maximum chip clearance for general sawing while also having the raised guard links 42 so that the chain also can be used for brush cutting, each guard link is positioned on the same side of the saw chain as the cutter link 14 or 16 immediately forwardly thereof which is the side of the chain opposite to that of the cutter link immediately behind the guard link. This provides a chip clearance space from the open side of the forward cutter link completely back to the depth gauge of the trailing cutter link without decreasing the effectiveness of the guard link in preventing brush from catching on the depth gauge of the trailing cutter link.

OPERATION

In sharpening the saw chain 18 (FIGS. 2 and 5) with the file guide 10, the chain saw 12 is placed on a log or bench with the engine stopped. The head 68 of the adjustment screw 60 is turned through a desired number of audible clicks to adjust the angular member 80 to provide the desired extent of sharpening for the entire chain, and the file guide is placed on the chain over one of the cutter links 14 and 16. The camming portions 30 are moved into engagement with the outer corner portions of the rounded end portions 34 and 36 (FIG. 6) of the center drive links 32, the member 80 passing over the tips 82 and 84 of the top plate 86 and the depth gauge 88 and the hold-down flange 118 engaging the edge 120 of the body 122 of the cutter link. The user then files the tip 82 of the top plate to a flush condition with the lands 94 and 97 and then files the tip of the depth gauge 88 to a flush condition with the lands 104 and 105. The user locates the file guide initially by pressing the flange 58 (FIGS. 2 and 6) downwardly to a position in which the tabs 22 and 24 engage the adjacent face 26 of the saw bar 11, and the set screw 93 engages the face 95 of the saw bar to steady the guide 10. During the filing, the file presses the guide to this position so that the operator can hold the file with both hands. After each cutter link is filed, the operator then, after lifting the file guide only enough for the locators 28 and flange 118 to clear the saw chain, moves the file guide to a position over the next cutter link on the upper edge of the saw bar and files the top plate and depth gauge, and continues to file the cutter links on the upper edge one after another. After all the cutter links on the upper edge of the saw bar have been filed, the chain is moved to present an unfiled section of chain and the filing is continued. This is continued until the entire length of the chain has been filed, all the cutting edges 96 being at the same height and all the depth gauges 88 being of the same height. The file 98 in filing the top plate 86 is moved along the flange 100 (FIG. 3) and primarily longitudinally along the tip 82 and the cutting edge 96, and since the only very hard or chromed portion which the file is moved longitudinally of is the edge 96 and the file presses this portion away from the body portion of the top plate, the file is no dulled and the sharpening is easy. However, if the surface 109 had also been made very hard like the chromium surface 107, the file would move along an elongated line 151 (FIG. 9) and be rapidly dulled, the line 151 being the juncture of the edge 82 and the surface 21.

The above-described file guide very accurately regulates the filing of all the top plates 86 and depth gauges 88. The file guide is positioned only on the near side of the saw for both right hand and left hand cutter links 14 and 16 so that it can be slid along the saw bar from link to link after only raising the guide sufficiently for the hold-down flange 118 to clear the cutter teeth. The file guide tensions the portion of the chain being filed and keeps it from moving outwardly and from rocking or moving transversely relative to the saw bar during the filing. While the member 80 is shown as having the angularly positioned lands 94 and 97 and 104 and 105, the member 80 may be arcuate rather than angular with a radius approximately equal to the radial distance from the center of the drive sprocket of the chain saw to the tips 82 and 84 of the cutter links on the sprocket and being chords of such an arc.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a file guide for sharpening a saw chain:
   a frame means provided with means for holding a portion of a saw chain having a cutter tooth and for engaging the gullet of said cutter tooth to locate the frame means in a predetermined position longitudinally of and at a predetermined height relative to said tooth,
   a guide member having a top, file guiding surface, and means mounting the guide member on the frame means in a position adjacent the tooth.

2. The file guide of claim 1 including means for adjusting the height of the guide member relative to the frame means.

3. The file guide of claim 1 wherein the frame means includes positioning means for engaging a side of a saw bar supporting the saw chain.

4. The file guide of claim 1 including means for engaging both sides of a saw bar supporting the saw chain.

5. The file guide of claim 1 wherein the guide member comprises a generally U-shaped frame member adapted to receive the saw chain and the adjacent portion of a saw bar supporting the saw chain, and means for clamping the frame member to the saw bar.

6. In a file guide for sharpening a saw chain:
a gauge member having a first opening for receiving a cutter tooth of a cutter link of a saw chain and a second opening for receiving a depth gauge of the link,
the gauge member having a first guide surface adjacent the first opening for guiding a file to file the top of the cutter tooth and also being provided with a second guide surface adjacent the second opening and inclined relative to the first guide surface for guiding the file to file the top of the depth gauge,
and means for locating the gauge member in a predetermined position on the saw chain in which the cutter tooth projects through the first opening and the depth gauge projects through the second opening.

7. The file guide of claim 6 wherein the guide member is provided with a portion at one side of the first opening for engaging a side of the cutter tooth.

8. The file guide of claim 6 wherein the guide member is provided with a portion at one side of the first opening for engaging a side of the depth gauge.

9. The file guide of claim 8 wherein the second opening is a slot closely receiving the depth gauge.

10. The file guide of claim 6 wherein the gauge member comprises an angular plate provided with the first and second openings therein.

11. The file guide of claim 10 wherein the gauge member has a pair of raised lands at opposite ends of the first opening and also has a pair of raised lands at opposite ends of the second opening.

12. In a file guide for sharpening a saw chain:
frame means having a pair of projections adapted to engage a pair of center drive links of a saw chain and hold a portion of the chain positioned between the center drive links and including between the center drive links a tooth to be sharpened,
and a guide member mounted on the frame means having a top guide surface for guiding a file to file a top of the tooth to be sharpened,
one of the frame means and the plate member serving to engage a top portion of the chain to space the top guide surface precisely relative to the top of the tooth to be sharpened.

13. In a file guide:
frame means including in upper plate extending laterally over the top of a saw chain on a saw bar of a chain saw and a pair of prong-like members extending downwardly from the upper plate into the spaces between a pair of spaced center drive links of the saw chain and between pairs of side links of the chain bracketing the pair of spaced center drive links,
the prong-like members fitting closely between the side links to locate the frame means laterally relative to the saw chain and also engaging the most adjacent ends of adjacent pairs of center drive links and taking out slack from the portion of the saw chain between the center drive links,
the frame means also including a flange for engaging a bottom edge of a gullet of a cutter link of the saw chain,
and file-guiding means carried by the frame means for guiding a file relative to said cutter link of the saw chain positioned between the pair of spaced center drive links.

14. In a file guide:
a guide plate having an opening therein for receiving a top-sharpenable top plate of a cutter tooth of a saw chain and also having a clearance groove extending across the opening and completely across the plate,
the plate having raised guide surfaces lying in the same plane at the top and opposite sides of the groove for guiding a file over the top plate of the cutter tooth,
and means for locating the guide plate in a predetermined position relative to the cutter tooth.

15. The file guide of claim 14 wherein the plate has a first side edge of the opening adapted to engage the side of one cutter tooth and an opposite side edge of the opening for engaging the side of a cutter tooth allochiral relative to said one cutter tooth, the opening being trapezoidal in shape.

16. The file guide of claim 15 wherein the guide plate has a first plate portion including the opening therein and also is provided with a second plate portion having a pair of slots therein through which depth gauges of the links carrying the allochiral cutter teeth may extend, the second plate portion having a second clearance groove extending across the slots and completely across the plate and also having raised guide surfaces lying in the same plane at the top and opposite sides of the second clearance groove for guiding a file over the depth gauges of the links.

References Cited
UNITED STATES PATENTS

| 2,755,559 | 7/1956 | Pearce | 33—202 |
| 2,768,450 | 10/1956 | Pearce. | |
| 2,813,438 | 11/1957 | Paradis et al. | 76—31 |

THERON E. CONDON, *Primary Examiner.*

U.S. Cl. X.R.

76—25; 33—202